United States Patent [19]

Miutel et al.

[11] Patent Number: 4,588,753

[45] Date of Patent: May 13, 1986

[54] PLASTICS CELLULAR MATERIAL

[76] Inventors: Alexander Miutel, 2007 Bloor St. West, Toronto, Ontario, M6S 1M5; Jerry P. Shira, both of Toronto, Canada

[21] Appl. No.: 665,993

[22] Filed: Oct. 29, 1984

Related U.S. Application Data

[62] Division of Ser. No. 581,590, Feb. 21, 1984, Pat. No. 4,482,649.

[51] Int. Cl.$^4$ ............................................. C08J 9/06
[52] U.S. Cl. ................................. 521/86; 521/110; 521/135; 521/138; 525/31; 525/529
[58] Field of Search ............... 521/86, 110, 135, 138; 525/31, 529

[56] References Cited

U.S. PATENT DOCUMENTS

| | | | |
|---|---|---|---|
| 3,993,609 | 11/1976 | Kamens et al. | 521/135 |
| 4,101,464 | 7/1978 | Kamens et al. | 521/135 |
| 4,482,649 | 11/1984 | Miutel et al. | 521/86 |

*Primary Examiner*—Morton Foelak
*Attorney, Agent, or Firm*—Fetherstonhaugh & Co.

[57] ABSTRACT

The invention relates to a plastics cellular material comprising the reaction product of an unsaturated polyester resin containing a polymerizable unsaturated monomer and an epoxy-based vinyl ester in the presence of surfactants.

6 Claims, No Drawings

PLASTICS CELLULAR MATERIAL

This invention relates to a plastics cellular material and is a division of application Ser. No. 581,590 filed on Feb. 21, 1984, now U.S. Pat. No. 4,482,649.

It is an object of the invention to provide a plastics cellular material having a resin binder that is resilient and has substantial strength in compression.

Polyester cellular materials have been made in the past but they tend to be brittle and lack resilience especially in medium to lighter densities. In result they are not strong in compression. It is an object of this invention to provide a plastics cellular material from a polyester resin that is strong in compression and has good resilience. There are many industrial uses for such a product including as a filler for doors and panels in buildings.

In addition to providing a strong and resilient plastics cellular material, it is an object of this invention to provide such a material that can be made fire-retardant. Prior attempts at the production of a plastics cellular material with good fire-retardant properties have not met with success. In addition to being weak in a structural sense, these materials have tended to have relatively poor fire-retardant properties and to emit deadly fumes as they burn.

A plastics structural material according to this invention comprises a resin binder characterised by the inclusion of products of the reaction of a polyester resin and epoxy based vinyl esters in the presence of a surfactants.

The invention will be clearly understood after reference to the following detailed specification.

In the production of a foam material described herein, two mixtures are first prepared and then brought together to react with each other and cause foaming. They subsequently cure to form the foam material.

The first mixture customarily includes an unsaturated fast-curing polyester resin, a vinyl copolymerizeable monomer compound, a finely dispersed gas releasing salt, hardening accelerators and finely dispersed surfactants.

The unsaturated resin is preferably a halogenated unsaturated polyester resin but, where fire retardancy is not a problem, general purpose resins may be used. There are many polyester unsaturated resins.

For a product of fire retardancy, selection of the proper resins is based on their maximum thermal stability potential. There are several factors that must be considered in order to access the thermal stability potential. One factor is the cohesive energy; this is a measurement of the secondary bond forces of a molecule. The lower the cohesive energy, the more volatile and the lower the melting point of the unsaturated polyester resin is. Higher values of cohesive energies are usually preferrable. Another factor is bond dissociation energy; this is the energy required to break down a bond. The higher the energy required to break down the bonds of the resin binder, generally the more heat resistant it will be; usually resins with higher dissociation energies are sought after but there are other properties of chemicals that may tilt the choice towards a different resin. Another factor is heat of combustion. Heat of combustion is the amount of energy that is liberated during combustion; the more energy that is liberated, the higher the flamibility is. Usually, resins with lower heat of combustion are sought after. These three factors, among others (eg. cross-link density, consideration of the co-polymerizable monomers used, consideration of the epoxy-based vinyl esters used and aromacity) must be considered together and they are not always coincidentally compatible. The same factors are considered in the selection of the monomers compounds to be referred to later.

The following cross-linking unsaturated polyester resins have been used with success:

HETRON 197—a trade mark for an unsaturated polyester resin of Ashland Chemicals—This is a highly reactive chlorinated tetra chlorophthalic resin with high chemical resistance and high heat distortion point. If this resin is used, some amount of antimony oxide should be added. This resin has the following characteristics:
 (i) flame spread factor of 20
 (ii) monomer content between 28–30%
 (iii) viscosity of approximately 2000–2200 CPS at 25° C.

HETRON 92—a trade mark for an unsaturated polyester resin of Ashland Chemicals—This polyester unsaturated chlorinated resin can be added to HETRON 197 in order to enhance the fire-retardancy of the polyester foam. Although it has lower smoke emission than HETRON 197, it also has lowered heat resistant capabilities. This resin has the following characteristics:
 (i) flame spread factor of 15
 (ii) viscosity of approximately 2500–2600 CPS at 25° C.

HETRON 31—a trade mark for an unsaturated polyester resin of Ashland Chemicals—This is a highly reactive, resilient (adipic acid type) chlorinated chemical. It can be added to HETRON-197 to increase the resiliency. It has a viscosity of approximately 1500 CPS at 25° C.

Brominated HETRON 670 P (a trade mark for an unsaturated polyester resin of Ashland Chemicals which also has a viscosity of about 800 CPS at 25° C.), chlorinated resins, general purpose isopthalic resins such as AROPOL-218 (a trade mark of Ashland Chemicals), or rigid resins may also be used.

Whether or not the unsaturated resin is halogenated or general purpose, the resulting plastics celluar material of this invention will have improved mechanical and physical properties when produced in accordance with this invention.

The next item in the first mixture, as noted above, are co-polymerizeable monomers. A co-polymerizable monomer compound is used for its cross-linking capabilities. The co-polymerizable monomer commonly used is styrene. Styrene is not the only acceptable vinyl co-polymerizable monomer chemically, but it is the most economical. Styrene may be replaced by amounts from 20 to 50% by co-polymerizable monomers of the acrylic types which have at least some of the following properties: strong reactive crosslinking ability in the presence of styrene and the other components, the ability to decrease the overall smoke emission of the foam in the case of fire, and the ability to improve the physical properties of the polyester foam.

An acceptable acrylic copolymerizeable monomer is methyl metacrylate. This cross-linking acrylic monomer, when partly exchanged for styrene performs several functions. First of all, it is a very reactive cross-linking monomer when it is in the presence of styrene. Secondly, in conditions of fire it generates less smoke emission than styrene; this is especially so in the presence of ferric hydroxy oxide. Thirdly, it improves the plastics cellular materials weatherability.

The next item in the first mixture, in the general formulation, is the finely dispersed gas-releasing salt, usually a carbonate or bicarbonate.

This is introduced for blowing purposes to react with the acid of the second mixture. The bicarbonate must be reactable with the acid and also have safe toxicity. In this particular embodiment, sodium bicarbonate is most satisfactory.

The finely dispersed gas-releasing salt may also perform the function of a nucleation filler by adding increased strength and body to the foam. Sodium bicarbonate does also perform the function of a nucleation filler.

The next item in the first mixture, in the general formulation, is the hardening accelerators.

As those skilled in the art are aware, accelerators are required to break down the organic peroxides, which are the catalysts, to form free radicals to initiate the cross-linking process, i.e. the cross-linking of the unsaturated polymers, the epoxy vinyl esters and the monomers. In effect, the accelerators solve the problem of adding heat to the system in order to initiate the catalyzation process. There are basically two types of accelerators commonly used: they are either a tertiary amine type or an organo-metallic salt type. Three accelerators that have been found to be satisfactory are dimethyl aniline, dimethyl paratoluidine, and cobalt octoate.

improved distribution of blowing may be substituted for those identified herein.

To the forgoing constituents of the first mixture is added an epoxy-based vinyl ester to increase the strength of the resin binder.

By using epoxy-based vinyl esters a final product of extraordinary strength may be achieved.

Epoxy-based vinyl esters are vinyl esters with epoxy backbones.

Unlike unsaturated polyester resins, epoxy-based vinyl esters have short chains and there are re-active double bonds located at the ends of each molecule. This structure allows for a more completed polymerization with the monomers and polyester resins.

All epoxy-based vinyl esters usually have low viscosity (i.e. approximately in the range from 350 to 1000 CPS at 25° C).

The structure of epoxy-based vinyl esters may be represented by the following configuration:

V-E-EC-E-V where the letter V represents a vinyl group, E represents an ester group, and EC represents the epoxy component.

The following is an example of a configuration for a possible epoxy-based vinyl ester:

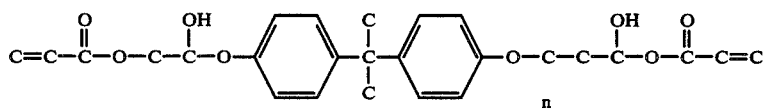

The next item in the first mixture, of the general formulation, is the surfactants.

Surfactants are asymetrical molecules which reduce the surface tension of the mixture by making the lipophyllic and hydrophyllic components compatible. Surfactants allow for improved distribution of the blowing agent throughout the mixture and they also prevent the foam from collapsing.

Manufacturers of surfactants publish technical information about their products and, in selecting a surfactant, one examines manufacturers' specifications with a view to finding a surfactant that is effective for the particular components in the mixtures where the surfactant is required. For example, The 3M Company distribute surfactants under their trade mark FLUORAD, and under this brand they have a surfactant identified as FC-430 that is specified to have excellent effectiveness with epoxy systems and with polyester systems. This surfactant is especially useful.

Dow Corning Corporation publish information about silicon surfactants and their DOW CORNING 198 surfactant of the nonionic silicon glycol copolymer type has also been found to have extraordinary effectiveness with this invention.

The surfactant identified herein as DOW CORNING 198 has been used satisfactorily with this invention in amounts from 0.3 to 1.0 w.p. (to 100 w.p. of unfilled polymers and monomers).

The FC-430 surfactant of 3M Company has been used successfully with this invention in amounts from 0.3 to 1.0 w.p. (to 100 w.p. of unfilled polymers and monomers).

It is contemplated that other surfactants capable of reducing the surface tension in a mixture to provide for The reactive sites are located at the double bonds of the two vinyl-ended molecule.

Some epoxy-based vinyl esters that have been used successfully are:

(i) DEREKANE-510N—a trade mark of Dow Chemical Canada Inc.: This epoxy-based vinyl ester imparts fire retardancy with high heat distortion.

(ii) DEREKANE-510A—a trade mark of Dow Chemical Canada Inc.: This epoxy-based vinyl ester imparts a high oxygen value and low flame spread.

(iii) DEREKANE-XD80804—a trade mark of Dow Chemical Canada Inc.: This is a rubber modified epoxy-based vinyl ester that imparts resiliency.

(iv) HETRON 922—a trade mark of Ashland Chemicals: This epoxy-based vinyl ester has low viscosity of approximately 500 cps at 25° C. and imparts high strength characteristics. This epoxy-based vinyl ester, in itself, is not fire retardant. However, when antimony trioxide is added in proportions of 3 to 5% of the quantity of HETRON 922, excellent fire retardancy is imparted to the plastics cellular material.

It has also been found that epoxy-based vinyl esters may be foamed and cured without the presence of polyester resins in the first mixture, providing that a high density plastics cellular material is desired. It is also important that the surfactants used are workable in the presence of epoxy-based vinyl esters. Two surfactants used together to foam epoxy-based vinyl esters are a nonionic silicon glycol polymer and a nonionic fluorochemical compound. Such a nonionic silicon glycol polymer is DOW CORNING 198, manufactured by Dow Corning corporation, and such a nonionic fluorochemical compound is FC-430, manufactured by 3M Company.

Almost any plastics foam material has a filler and the selection suitable to the end use of the particular foam is, in the case of many fillers, skill in the art.

However, disclosed herein is the use of a combination of fusible fillers, which begin melting at relatively low temperatures and retain a spreaded liquidous form over a large temperature range, and high temperature fillers, which resist melting at high temperatures and form an insulative layer over the resin binder, is able to impart fire resistent properties to the plastics cellular material.

The high temperature fillers, which provide an insulative layer of solid over the resin binder, are complemented by the fusible fillers, whose spreaded liquidous layer seals cracks, pores and like areas of exposure of the resin binding as well as wetting the outer carbonized layer of the resin binding and covering the high temperature fillers themselves, to provide increased fire resistance.

The high temperature fillers may include carbonization accelerating fillers which accelerate the insulative carbon layer to form on the said resin binder. The high temperature fillers and fusible fillers may also include fillers capable of releasing chemically-bonded water or gas in high temperatures, thereby having an immediate cooling effect on the resin binder and the fillers present.

The foam material of this invention can be made to be very fire-resistant and, in this form, it has particular use in building construction.

Fusible fillers are fillers that melt at relatively low temperatures and retain a spreaded liquidous form over a large temperature range. In the case of fire, they become liquid with the early application of heat in perhaps the 360°–650° C. range and, in this form, they form an liquidous layer barrier to oxygen transfer to the combustion polymer. Preferably fusible fillers are selected that melt at varying temperatures as, with an increasing temperature, thicker carbonateous layer is produced which demands more melted substance to seal cracks or pores, ie as the temperature rises, further fusible fillers which melt at a somewhat higher temperature become liquid to continue this function in the foam material. Low melting-point fusible fillers may become liquidous at as low a temperature as 250° C. Certainly at least one of the fusible fillers should be melted and performing its fire retardancy function before a temperature of 950° C. is reached. Suitable fusible fillers are leadless borax-type glass, boric acid, zinc borate and a metavanadate such as sodium metavanadate or potassium metavanadate or lithium metavanadate.

Leadless borax-type powdered glass is a finely ground powdered glass that has a low melting point approximately between 700°–750° C. It has been successfully used, as a fusible filler, in quantities between 0–20 w.p. (per 100 w.p. unfilled polymers and monomers).

Sodium metavanadate is a finely ground anhydrous salt that, as a fusible filler, very effectively spreads a liquidous layer; just as important, it also contributes to the homogeneous spreading of all the melted compounds. Sodium metavanadate is especially effective in wetting the carbon layer of the resin binding. Sodium metavanadate has a low melting point of approximately 300°–350° C. and it has been successfully used as a fusible filler in quantities between 0–5.0 w.p. (per 100 w.p. unfilled polymers and monomers).

Boric acid is a filler which begins to release chemically bonded water when the increasing temperature reaches approximately 185° C., releasing 1.0 mole of water per mole of boric acid. The byproduct, other then water, is metaboric acid; molecules of metaboric acid will commence, at approximately 250° C. to combine in pairs to release, for each pair, one mole of water and mole of boric oxide. Boric oxide is a fusible filler which melts at approximately 450° C. and will remain melted at temperatures above 1400° C. Boric acid has been successfully used, as a fusible filler, in quantities of 12 to 25 w.p. (per 100 w.p. unfilled polymers and monomers).

Zinc borate, in its unheated form, is a uniform white powdered crystalline material and has a melting point of approximately 500° C. As a fusible filler, it has been successfully used in amounts from 3.0 to 8.0 w.p. (per 100 w.p. unfilled polymers and monomers).

These fillers then are capable of maintaining a spreaded liquidous form over a substantial temperature range under conditions of fire. They remain in a melted state and spread over the heated surface of the resin binder to cover it with a thin homogeneous layer. This liquidity acts as a physical barrier to protect the resin binder from oxidation under conditions of high temperature encountered in fire.

In addition to fusible fillers, high temperature fillers are used in combination with fusible fillers. These high temperature fillers do not melt; they tend to resist melting at the higher temperatures and form an insulative layer over the resin binder. They are refractory materials with high temperature resistance that do not decompose upon being subjected to elevated temperatures in the range of 1400° C. up. Chemically these compounds may be pure oxide compounds such as hydrated aluminum oxide or fibrous and non-fibrous metal silicates.

A filler consisting of essentially calcium metasilicate and sold under the trade name NYAD 325 (Wollastonite), made by Prescott & Company (Canada) Ltd., has been found satisfctory. This product is about 98% calcium metasilicate with the balance being substantially ferrous and aluminum oxide. It melts at about 1540° C. The filler is used advantageously from 5.0 to 25.0 w.p. (per 100 w.p. of unfilled polymers and monomers).

Another refractory filler that has been used, with success, is sodium potassium aluminum silicate without free silica or quartz. It melts at a temperature of over 1400° C. Its finest particles will provide good nucleation properties. Such a refractory filler sold under the trade mark of NEPHELINE SYENITE A-400 by INDUSMIN LTD. is a workable filler and provides a good non-reinforcing filler when used in formulations from 5.0 to 25.0 w.p. (to 100 w.p. of unfilled polymers and monomers).

Another high temperature filler is hydrated aluminum oxide. At temperatures between approximately 220° C. and 600° C., water molecules are released. The aluminum oxide, which is left over after this water loss, has excellent heat resistance and a melting point above 1600° C. This filler is very effective when used in formulations from 5.0 to 25.0 w.p. (to 100 w.p. of unfilled polymers and monomers).

Other high temperature fillers include mineral wool, which chemically is calcium magnesium (diopsid) silicate; this high temperature filler has a melting point of approximately between 1260° C. to 1280° C.

The high temperature fillers include also carbonization accelerating fillers. These fillers accelerate the formation of a carbon layer on the polymer binders under conditions of fire. Ferric oxide with zero to three moles of water per mole of ferric oxide is a carbonization accelerating filler; this particular filler can release chemically bonded water in a quantity relative to the mole composition of water when it reaches a temperature of approximately 500° C. Ferric oxide, itself, is a high temperature filler, which melts at approximately 1560° C. It is an effective smoke suppressant especially in the presence of methyl-metacrylate, which is always included in the mix when fire retardancy is a concern. Ferric oxide acts as an effective carbonization accelerating filler and promotes the carbonization of the resin binder and the protection of the inner parts of the foam when heat is being applied.

Another carbonization accelerator filler is ferric chloride.

As mentioned above, the second mixture which is separately mixed and, in this process, added to the first mixture can, in the broadest aspect of the invention be a mixture of the type previously used in the production of foam materials according to the prior art.

The second mixture customarily includes an acidic solution which will react with the gas-releasing salt as a blowing agent, and organic catalysts.

There are many acceptable acidic solutions.

The acidic solution should be adjusted to compliment the resinous composition. When the PH of the acid is modified, the surfactancy and fire-retardancy of the final product can be modified through the introduction of the inorganic salt solution.

The following aqueous solution has been successfully used, in this invention, in the following ranges of proportions:
water—5.0 to 10.0 w.p.
citric acid—1.0 to 7.0 w.p.
acetic acid—0.5 to 3.0 w.p.

The more diluted the acidic solution is, the greater the quantity being introduced into the mix; excessive amounts of water are not desireable. The following ratio has been found not to produce acetic acid odour and introduce an acceptable amount of water:
water—10.0 w.p.
citric acid—4.0 w.p.
acetic acid—1.0 w.p.

Triethyl phosphate with or without citric-acidic acid can also been used. It has been found that triethyl phosphate allows for a more even distribution of the gaseous bubbles during the blowing process.

The second mixture, of the general process, also includes an inorganic salt solution as buffer.

An inorganic salt can be used to aid in lowering the surface tension of the foaming cellular plastics material and increase the fire retardancy. The use of an inorganic salt, in this process, is well-known in the art. An inorganic salt that has been successfully used, in this invention, is ammonium sulfamate solution that is 30% aqueous (a concentration close to saturation).

The acidic solution and the inorganic salt solution can be mixed together in the following proportions, by weight, in order to attain a suitable foam:
citric-acetic solution 4–8 w.p. (per 100 w.p. unfilled polymers and monomers)
ammonium sulfamate 3–6 w.p. (per 100 w.p. unfilled polymers and monomers)

The next item in the second mixture, of the general formula, is the organic catalyst. Catalysts are required to cure the vinyl-copolymerizable resins, the epoxy-based vinyl ester and the monomers; they accomplish this after being activated by accelerators.

In this invention, benzoyl peroxide can be used as the main catalyst; it is very reactive in ambient temperatures. Benzoyl peroxide has been effectively used in amounts from 3.8 to 5.0 w.p. (per 100 w.p. unfilled polymers and monomers).

The following are specific examples of concentrations of components that can be used according to this invention:

EXAMPLE ONE

| component | quantity | |
|---|---|---|
| First Mixture | | |
| HETRON - 922 (epoxy based vinyl ester) | 70.0 | w.p. |
| AROPOL - 218 (polyester resin) | 25.0 | w.p. |
| methyl methyacrylate (monomer) | 5.0 | w.p. |
| surfactant FC-430 | 0.5 | w.p. |
| surfactant DOW CORNING 198 | 0.5 | w.p. |
| dimethyl analine | 0.25 | grams |
| dimethy paratoluidine | 0.1 | grams |
| cobalt napthenate | 0.15 | grams |
| ferric oxide | 5.0 | w.p. |
| calcium silicate | 30.0 | w.p. |
| sodium potassium aluminum silicate | 20.0 | w.p. |
| calcium magnesium (diopsid) silicate | 20.0 | w.p. |
| sodium bicarbonate | 12.0 | w.p. |
| Second mixture | | |
| aqueous acidic solution | 6.0 | w.p. |
| benzoyl peroxide | 5.0 | grams |

The 6.0 w.p. aqueous acidic solution is made up of 1.0 w.p. acetic acid, 4.0 w.p. citric acid and 10 w.p. water.

This is a foam that is strong but not fire retardant. All the fillers are added for the purpose of nucleation. There is no fusible filler added to combine with the high temperature melt fillers and, therefor, fire retardancy is not a main concern with this foam. The resulting foam has a density of approximately 25 to 26 pounds per cubic foot and has contruction applications where fire retardancy is not a concern.

EXAMPLE TWO

| component | quantity | |
|---|---|---|
| First Mixture | | |
| HETRON - 922 (epoxy based vinyl ester) | 60.0 | w.p. |
| AROPOL - 218 (polyester resin) | 34.0 | w.p. |
| methyl methacrylate (monomer) | 6.0 | w.p. |
| surfactant FC-430 | 0.4 | w.p. |
| surfactant DOW CORNING 198 | 0.6 | w.p. |
| dimethyl analine | 0.25 | w.p. |
| dimethyl paratoluidine | 0.1 | w.p. |
| cobalt naphthenate | 0.2 | w.p. |
| hydrated aluminum oxide | 55.0 | w.p. |
| boric acid | 1.0 | w.p. |
| fumed silica gel | 0.5 | w.p. |
| sodium bicarbonate | 14.0 | w.p. |
| Second mixture | | |
| aqueous acidic solution | 6.0 | w.p. |
| benzoyl peroxide | 5.0 | grams |

The 6.0 w.p. aqueous acidic solution is made up of 1.0 w.p. acetic acid, 4.0 w.p. citric acid and 10 w.p. water.

The resulting foam has a density of between 18 to 20 pounds per cubic foot and is not fire retardant. The fillers are added for the purpose of nucleation. This foam can be used as a structural foam.

EXAMPLE THREE

| component | quantity | |
|---|---|---|
| First Mixture | | |
| HETRON (epoxy based vinyl ester) | 50.0 | w.p. |

-continued

| component | quantity |
|---|---|
| AROPOL-218 (polyester resin) | 45.0 w.p. |
| methyl methacrylate (monomer) | 5.0 w.p. |
| surfactant FC-430 | 0.35 w.p. |
| surfactant DOW CORNING 198 | 0.7 grams |
| dimethyl analine | 0.15 w.p. |
| dimethyl paratoluidine | 0.2 w.p. |
| cobalt naphthenate | 0.22 w.p. |
| hydrated aluminum oxide | 20.0 w.p. |
| fumed silica gel | 1.0 w.p. |
| sodium bicarbonate | 16.0 w.p. |
| Second mixture | |
| aqueous acidic solution | 9.0 w.p. |
| benzoyl peroxide | 5.0 w.p. |

The 6.0 w.p. aqueous acidic solution is made up of 1.0 w.p. acetic acid, 4.0 w.p. citric acid and 10 w.p. water.

The resulting foam has a density of between 13 to 14 pounds per cubic foot and is not fire retardant. The fillers are added for the purpose of nucleation. This foam can be used as a structural foam.

EXAMPLE FOUR

| First Mixture | |
|---|---|
| HETRON (epoxy based vinyl ester) | 70.0 w.p. |
| HETRON - 197 (polyester resin) | 23.0 w.p. |
| methyl methacrylate (monomer) | 7.0 w.p. |
| FC-430 (surfactant) | 0.7 w.p. |
| DC-198 (surfactant) | 0.4 w.p. |
| sodium bicarbonate | 18.0 w.p. |
| dimethyl aniline | 0.25 w.p. |
| dimethyl paratoluidine | 0.10 w.p. |
| cobalt napthenate | 0.15 w.p. |
| hydrated ferric oxide | 3.0 w.p. |
| antimony trioxide | 5.0 w.p. |
| calcium metasilcate | 10.0 w.p. |
| zinc borate | 3.0 w.p. |
| hydrated aluminum oxide | 30.0 w.p. |
| sodium potassium aluminum silicate | 15.0 w.p. |
| boric acid | 14.0 w.p. |
| powdered borax glass | 15.0 w.p. |
| sodium metavanadate | 5.0 w.p. |
| Second mixture | |
| aqueous acidic solution* | 10.0 w.p. |
| benzoyl peroxide (catalyst) | 5.0 w.p. |

*The aqueous solution is composed of 1.0 w.p. acetic acid, 4.0 w.p. citric acid, 10.0 w.p. water to make up 8.0 w.p. of the aqueous acidic solution and ammonium sulfamate 30% aqueous solution making up 2.0 w.p. of the 10.0 w.p. aqueous acidic solution.

This resulting plastics cellular material is a foam with high fire resistance. It has a density of between 25 to 26 pounds per cubic foot and its applications include door filler and wall panels.

EXAMPLE FIVE

| First Mixture | |
|---|---|
| HETRON - 922 (epoxy based vinyl ester) | 70.0 w.p. |
| HETRON - 197 (polyester resin) | 25.0 w.p. |
| methyl methacrylate (monomer) | 5.0 w.p. |
| FC-430 (surfactant) | 0.7 w.p. |
| DC-198 (surfactant) | 0.4 w.p. |
| sodium bicarbonate | 12.0 w.p. |
| dimethyl aniline | 0.25 w.p. |
| dimethyl paratoluidine | 0.10 w.p. |
| cobalt napthenate | 0.20 w.p. |
| antimony trioxide | 3.0 w.p. |
| hydrated aluminum oxide | 45.0 w.p. |
| boric acid | 0.5 w.p. |
| fumed silica gel | 0.5 w.p. |
| Second mixture | |
| aqueous acidic solution* | 4.0 w.p. |
| benzoyl peroxide (catalyst) | 5.0 w.p. |

*The aqueous solution is composed of 1.0 w.p. acetic acid, 4.0 w.p. citric acid, 10.0 w.p. water to make up 3.5 w.p. of the aqueous acidic solution and ammonium sulfamate 30% aqueous solution making up 0.5 w.p. of the 4.0 w.p. aqueous acidic solution.

This resulting plastics cellular material is a fire-retardant foam, but, because of the relative quantity and combination of fillers, it has lower fire resistance than example four. It has a density of between 30 to 32 pounds per cubic foot and its application include bathtubs and shower stalls.

EXAMPLE SIX

| First Mixture | |
|---|---|
| HETRON (epoxy based vinyl ester) | 50.0 w.p. |
| HETRON - 197 (polyester resin) | 43.0 w.p. |
| methyl methacrylate (monomer) | 7.0 w.p. |
| FC-430 (surfactant) | 0.5 w.p. |
| DC-198 (surfactant) | 0.5 w.p. |
| sodium bicarbonate | 16.0 w.p. |
| dimethyl aniline | 0.25 w.p. |
| dimethyl paratoluidine | 0.10 w.p. |
| cobalt napthenate | 0.15 w.p. |
| antimony trioxide | 5.0 w.p. |
| calcium metasilcate | 5.0 w.p. |
| hydrated ferric oxide | 5.0 w.p. |
| hydrated aluminum oxide | 20.0 w.p. |
| boric acid | 10.0 w.p. |
| powdered borax glass | 10.0 w.p. |
| sodium metavanadate | 3.0 w.p. |
| Second mixture | |
| aqueous acidic solution* | 12.0 w.p. |
| benzoyl peroxide (catalyst) | 5.0 w.p. |

*The aqueous solution is composed of 1.0 w.p. acetic acid, 4.0 w.p. citric acid, 10.0 w.p. water to make up 10.0 w.p. of the aqueous acidic solution and ammonium sulfamate 30% aqueous solution making up 2.0 w.p. of the 12.0 w.p. aqueous acidic solution.

This resulting plastics cellular material is a fire-retardant foam. Because of the relative quantities and selection of fillers used, this foam has less fire resistance than Example Four but more fire resistance than example five. It has a density of between 10 to 12 pounds per cubic foot and its applications include structural foam.

EXAMPLE SEVEN

| component | quantity |
|---|---|
| First Mixture | |
| HETRON-922 (epoxy based vinyl ester) | 95.0 w.p. |
| methyl methacrylate (monomer) | 5.0 w.p. |
| surfactant FC-430 | 0.5 w.p. |
| surfactant DOW CORNING 198 | 0.5 w.p. |
| dimethyl analine | 0.25 grams |
| dimethy paratoluidine | 0.1 grams |
| cobalt napthenate | 0.15 grams |
| ferric oxide | 5.0 w.p. |
| calcium silicate | 30.0 w.p. |
| sodium potassium aluminum silicate | 20.0 w.p. |
| calcium magnesium (diopsid) silicate | 20.0 w.p. |
| sodium bicarbonate | 12.0 w.p. |
| Second mixture | |
| aqueous acidic solution | 6.0 w.p. |
| benzoyl peroxide | 5.0 grams |

The 6.0 w.p. aqueous acidic solution is made up of 1.0 w.p. acetic acid, 4.0 w.p. citric acid and 10 w.p. water.

This is a foam that is strong but not fire retardant. There is no polyester resin, but only the epoxy-based vinyl ester in the first mixture. All the fillers are added for the purpose of nucleation. There is no fusible filler added to combine with the high temperature melt fillers and, therefor, fire retardancy is not a main concern with this foam. The resulting foam has a density of approximately 25 to 26 pounds per cubic foot and has contruction applications where fire retardancy is not a concern.

It is not intended that the foregoing examples should be read in restricting way and it is not intended that the product claims should be restricted to the specific method of manufacture disclosed.

The embodiments of the invention in which an exclusive property or privilege is claimed are defined as follows:

1. A plastics cellular material comprising the reaction of an unsaturated polyester resin containing a polymerizable unsaturated monomer and an epoxy-based vinyl ester in the presence of surfactants.

2. A plastics cellular material as claimed in claim 1 wherein co-polymerizeable monomers of the acrylic types with the ability to cross-link with said polyester resin and said epoxy based vinyl esters are included in the said reaction.

3. A plastics cellular material as claimed in claim 1 wherein styrene as a co-polymerizeable monomer is included in the said reaction.

4. A plastics cellular material as claimed in claim 2 wherein the said co-polymerizable monomer of the acrylic type is methyl methacrylate.

5. A plastics cellular material as claimed in claim 1 wherein the said surfactants are nonionic silicon glycol polymers and nonionic fluorochemical compounds.

6. A plastics cellular material as claimed in claim 1 wherein the said polyester resin is a halogenated resin.

* * * * *